United States Patent [19]

Kraus et al.

[11] 4,030,303
[45] June 21, 1977

[54] WASTE HEAT REGENERATING SYSTEM

[76] Inventors: Robert A. Kraus; Edmund J. Kraus, both of 14160 Redhill, Tustin, Calif. 92680

[22] Filed: Oct. 14, 1975

[21] Appl. No.: 622,266

[52] U.S. Cl. .............................. 60/688; 60/325; 60/643; 60/670
[51] Int. Cl.$^2$ ...................................... F01K 25/04
[58] Field of Search ............ 60/689, 688, 650, 651, 60/670, 671, 325, 645, 685, 675

[56] References Cited
UNITED STATES PATENTS

| 3,352,108 | 11/1967 | Eddy | 60/675 |
| 3,822,554 | 7/1974 | Kelly | 60/655 |

Primary Examiner—Allen M. Ostrager

[57] ABSTRACT

The invention described herein pertains to a combination hydraulic thermodynamic prime mover, for the conversion of thermal energy from low-temperature heat sources, such as solar heat, geothermal steam of poor quality and waste heat of all kinds, into useful mechanical or electrical power, employing a new and novel technique of low temperature-pressure energy conversion.

12 Claims, 1 Drawing Figure

WASTE HEAT REGENERATING SYSTEM

FIELD OF THE INVENTION

This invention relates to a Rankine cycle vapor power plant and, in its preferred embodiment, relates to a secondary regeneration cycle as an appendix to a primary steam power plant, utilizing waste heat from the primary cycle in combination with a hydraulic power extraction cycle.

DESCRIPTION OF THE PRIOR ART

The conversion of thermal energy from its dormant state into useful mechanical or electrical power is only possible at the expense of the loss of a major portion of thermal energy across a thermodynamic system's boundary, wherein that heat loss represents an essential element necessary for the thermodynamic concept of operation, and being subject to a partial recovery and regeneration within a secondary regeneration cycle of a binary power plant. Wherein that secondary regeneration cycle comprises, among other components not discussed herein, a singular combination condenser-boiler heat exchanger means, representing the interface between that binary's primary and said secondary cycle.

And, wherein that heat exchanger means serves to exchange latent heat of condensation from that primary cycle's working fluid to that binary system's secondary regeneration cycle's working fluid at that primary cycle's condensation temperature. Further basic components to complete the secondary system's cycle are: a vapor turbine expander, a secondary condenser, and a boiler feed pump. The primary power cycle's working fluid may be ordinary water steam at extreme high pressure-temperature and the secondary power cycle's working fluid has a boiling point substantially lower than that of that primary cycle's condensation temperature.

SUMMARY

Secondary power-producing systems of the prior art employing a working fluid of low boiling point and utilizing waste heat from a primary power cycle are sound in their concept of operation, while their thermal efficiency is quite low. It is commonly known that turbine efficiencies are sharply increasing with the rise of a thermodynamic system's pressure-temperature operation, and vice versa, as the system's pressure-temperature operation decreases. That is to say that turbine expanders are not very efficient at the primary power cycle's available condensation temperature, regardless of the type of working fluid used.

THE OBJECT OF THE INVENTION

Accordingly, it is an object of our invention to provide a workable and economical concept for low temperature energy conversion, utilizing a closed heat vapor power cycle in combination with a hydraulic power extraction cycle, comprising a hydraulic turbine, preferably, but not necessarily, of the Kaplan type, designed for low head operation and excellent efficiency. The device in our own invention is as follows:

DESCRIPTION OF THE BASIC COMPONENTS

Figure 1:
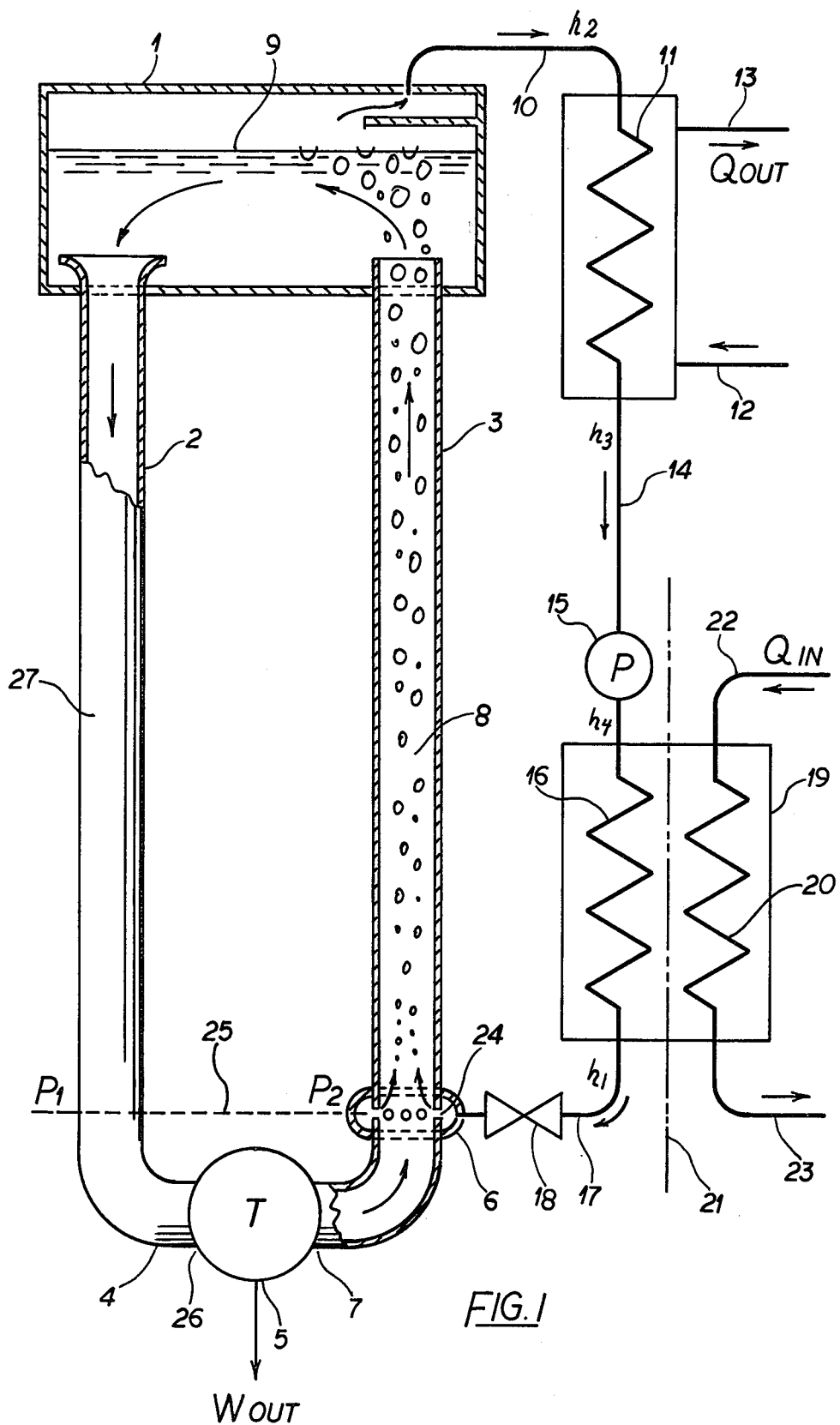
FIG. 1 shows a diagrammatical view of the preferred embodiment, incorporating all major components necessary for the completion of the basic heat vapor and hydraulic power extraction cycle, with some components in sectional view, wherein the system is a completely independent operating unit, utilizing waste heat from a primary thermal power-generating plant.

The perferred system in FIG. 1 shows the following components: A separator tank 1 from which there is extending downward and upward a vertical tubular circulating system comprising a penstock 2 and upstock 3. The lower end 4 of the tubular circulation system incorporates a hydraulic turbine 5, preferably, but not necessarily, of the Kaplan type, between penstock 2 and upstock 3. A hot gas inducer section 6 is placed immediately behind the turbine exhaust 7 at the lowermost effective portion of the system's upstock 3, dotted line 25.

The system's hydraulic fluid 8 which preferably, but not necessarily, may be ordinary water, extends from the system's lowermost portion 4 to the fluid level 9 within the gas separation tank 1 at that system's uppermost portion. A vapor header 10 connects the separator tank 1 with the system's condenser 11 having cooling water inlet 12 and outlet 13. A liquid header 14 connects the condenser 11 via condensate pump 15 to the system's boiler 16. The boiler 16 is connected via header 17 and control valve 18 to the hot gas inducer 6, comprising gas inducer holes 24, completing therewith the system's heat vapor power cycle.

The system's singular combination condenser-boiler 19 comprises the said cycle's boiler 16 and a primary power-producing plant's turbine condenser 20, separated at their interfaces 21, wherein that turbine condenser incorporates a water-steam inlet 22 and a condensate outlet 23.

CONCEPT OF OPERATION PREFERRED EMBODIMENT

The system described herein is basically a heat vapor power cycle designed to pick up latent heat of condensation from a primary power cycle's turbine condenser 20 to be utilized and to be converted into useful mechanical or electrical power, wherein that heat vapor power cycle is a basic vapor heat-engine cycle consisting of a condenser-boiler 19, a hydrodynamic power-turbine cycle 27, condenser 11, and boiler feed pump 15, in which that hydrodynamic power-turbine cycle 27 takes the place of a vapor expansion engine or vapor expansion turbine normally used with a Rankin vapor power cycles. And, wherein that hydrodynamic power cycle comprises a thermally insulated tubular U-circulation system having a tubular upstock 3, a hermetically-sealed fluid-gas separator tank 1, a tubular penstock 2, a hydraulic power extraction turbine 5 and a gas inducer section 6, which operates as follows: heated vapor enters the hydrodynamic cycle's working fluid at that upstock's gas inducer section 6 at that fluid's temperature and at substantially higher pressure, whereafter it flows within that system's upstock 3 immiscible together with that hydrodynamic fluid upward, to expand within said fluid with the production of work and being separated from that hydrodynamic fluid within the system's separation tank 1 by means of gravity separation. Upon separation, that expanded vapor enters the system's condenser 11 where heat is removed, condensing it to a liquid. The liquid is pumped at boiler pressure into the boiler 16 by the boiler feed pump 15 and is there evaporated to return via gas inducer 6 to the hydrodynamic fluid recirculate within that fluid circulating system.

In an analysis of that heat power-hydrodynamic cycle herein, the determination of the work and heat flow in the various parts of that cycle is as follows:

There are four basic elements in that heat vapor-hydrodynamic cycle combination: a pump 15 and a hydrodynamic turbine cycle 27 whose purpose is the transfer of work, as well as a boiler 16 and condenser 11 whose purpose is the transfer of heat, all of which are steady flow devices and it will be assumed that the potential and kinetical energy changes are negligible.

Heat is supplied to the system only by the boiler. There is no work done there and $$Q_{in} = h_1 - h_4$$

(The numbers refer to points on the cycle FIG. 1).
Heat is ejected only at the condenser 11.

$$Q_{out} = h_2 - h_3$$

(The sign has been ignored here since only the numerical value is desired).

Work is done by that hydrodynamic turbine cycle. Heat losses are very small since the entire system is thermally insulated and the process is assumed to be adiabatic.

The thermal efficiency can be obtained from the ratio of net work (the numerical difference between that hydrodynamic turbine cycle and pump work) and the heat input.

The hydrodynamic turbine cycle as a whole, and as a separate entity, must be looked upon as a steady flow prime mover within the total thermodynamic system (as in analogy, a turbine expander is part of a Rankin cycle). Wherein the pump 15, the boiler 16, that hydrodynamic turbine cycle 27 and the condenser 11 are the four basic components which approximates a complete Rankine cycle in the system herein.

To analyze that vertically oriented hydrodynamic turbine cycle alone, the system operates as follows and includes the tubular upstock 3, comprising at its lowermost effective portion, dotted line 25, a gas inducer section 6, having gas inducer holes 24, which function it is to induce that vapor cycle's heated gas directly into that hydrodynamic turbine cycle's fluid at equal temperature and at substantially higher pressure.

Upon the induction, that heated gas expands within that hydrodynamic fluid to rise at first, in the form of tiny bubbles, within that cycle's fluid, and that system's upstock 3 and separator tank 1, to be separated from that fluid through that fluid's surface 9 by means of gravitational separation and, whereafter, that gas at the point of separation from that fluid, is expanded to the condenser's pressure and enters that condenser 11 to be cooled and condensed to its liquid state.

After induction into the hydrodynamic cycle's fluid and upon that gas rising toward that fluid's surface in form of tiny bubbles, it expands and, by means of that fluid's displacement, gives rise to a change in the total contents density within the system's upstock 3 and part of the separator tank 1, thereby inversely causing a difference in the hydraulic pressure-heads at the lowermost portion between the system's upstock 3, as represented by $P_2$ and the system's penstock 2, as represented by $P_1$, respectively, at dotted line 25, which inversely causes an accelerating circulation of that hydrodynamic cycle's fluid in direction of the arrows in FIG. 1, wherein;

$$P_1 - P_2 = P_3$$

and $P_3$ represents the pressure difference across that hydrodynamic system's hydraulic turbine 5 at turbine inlet 26 and turbine outlet 7, causing that hydraulic turbine to spin with a production of prime motive power as long as a steady flow of heated gas is available at that hydrodynamic cycle's gas inducer.

Since the gas separator tank on the system's uppermost portion is hermetically sealed, a complete recovery of the expanded gas is assured. After cooling and condensation into liquid state within condenser 11, the liquid gas is pumped by pump 15 to boiler 16, where a steady supply of waste heat from a primary power-producing plant's turbine exhaust, in the form of latent heat of condensation, is transferred from the condenser 20 of the condenser-boiler heat exchanger means 19, across the primary and secondary systems' boundary 21 into boiler 16, thereby assuring a steady flow of heated gas into the hydrodynamic system's fluid for the expansion within the system's upstock 3.

In the diligence, during actual construction of a scaled down model of such a system, it has been proven that the philosophy and operational concept for such systems is sound and physically demonstratable.

The foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention.

What is claimed as new is as follows:

1. A power-producing heat engine system, comprising a first closed, heat vapor power cycle;
    incorporating a vertical-oriented, closed, partially heated and partially cooled, condensible fluid-vapor circulating system;
being connected in the proper sequence with the working fluid's circulation, and consisting of a boiler feed pump, a boiler heat-exchanger means having a separate heating fluid inlet and a heating fluid outlet, a hydrodynamic gas expander means and a condenser heat-exchanger means having a separate cooling fluid inlet and a cooling fluid outlet;
    which arrangement comprises the continuous introduction of a liquid gas by pump to said boiler means at boiler pressure and its heating and evaporation therein, an adiabatic expansion of said heated vapor within said hydrodynamic expansion means to condenser pressure, the condensation of said vapor to initial state within said condenser means, and the reintroduction of said condensed gas by pump to boiler means, thus beginning a new cycle;
utilizing a condensible gas having a boiling point substantially lower than the condensation temperature of water at specific pressure;
    wherein said first heated vapor power cycle serves the purpose of continuously heating and cooling a quantity of said condensible gas;

which system further comprises a second closed hydrodynamic power extraction cycle, operating together with said first heated vapor cycle in an immiscible combined flow upward through their common tubular expansion means;

incorporating a vertically oriented, closed, non-condensible fluid circulation system, being connected in the proper sequence of said fluid's circulation, and consisting of a vertically oriented tubular gas expansion means having a gas inducer section at its lowermost portion, a hermetically sealed vapor separation means on the system's uppermost portion having a fluid inlet and a fluid outlet, as well as a vapor outlet, a vertically oriented tubular penstock, and a hydrodynamic power extraction turbine;

utilizing a non-compressible fluidic circulating medium;

wherein said first cycle's heated gas enters said second cycle's non-compressible fluid at said expansion means gas inducer section at a substantially higher pressure, to circulate immiscibly together through said common tubular expansion means, from its lowermost portion upwards, to be expanded therein into said separation means to condenser pressure and being separated from each other within said separation means;

whereafter, said expanded vapor, upon its separation from said non-compressible fluid, enters said condenser means to be condensed therein;

and said non-compressible fluid, upon its separation from said vapor, enters said vertically oriented fluid penstock in a downward flow, and through said turbine means at the system's lowermost portion, and on through said gas inducer means to begin a new cycle;

and in which power-producing system the introduction of said heated gas into said non-compressible fluid through said gas inducer section at the lowermost portion of said hydrodynamic expansion means, produces by virtue of said gas's expansion within said fluid and said vertical expansion means, the reduction of said common immiscibly upwards flowing mass' specific gravity as a whole;

as compared to the higher specific gravity of the separated downward flowing non-compressible fluid's mass, within the system's penstock;

giving rise to a difference in the hydrodynamic pressure heads between said turbine means' fluid inlet and its fluid outlet, thus giving rise to a circulation of said non-compressible fluid in the proper sequence through said second cycle's circulation system;

and in which system said turbine means is conveniently used for the conversion of said flowing fluid's kinetical energy, into rotary shaft work within said turbine means.

2. A system as in claim 1, in which the second cycle's non-comprehensible working fluid is heated and kept at constant temperature.

3. A system as in claim 1, wherein that system's vertical expansion means and that system's penstock are located coaxial to each other.

4. A system as in claim 1, wherein that first cycle's heated gas enters that second cycle's non-compressible fluid through that system's gas inducer section at equal temperature and at substantially higher pressure.

5. A system as in claim 1, wherein the boiler is a regular-fired, low-temperature boiler.

6. A system as in claim 1, in which that system's first cycle's condensate is entering that system's boiler by means of that condensate's hydrodynamic pressure head;

wherein that first cycle's hydrodynamic pressure head is higher than that system's second cycle's hydrodynamic pressure head at the level of that system's gas inducer.

7. A system as in claim 1, comprising a condenser-boiler heat exchanger means, wherein the condenser section of that heat exchanger means is the turbine condenser of a primary power-producing plant's vapor cycle;

whereas, the boiler section of that heat exchanger means is an evaporator-boiler of that secondary power-producing system's vapor cycle herein.

8. A system as in claim 1, wherein that first cycle's boiler is a collector absorber means for direct or concentrated sun-emitted thermal radiation.

9. A system as in claim 1, which incorporates a control means located between that system's boiler and that system's gas inducer.

10. A system as in claim 1, wherein the first cycle's condenser means is an open cycle air to, liquid heat exchanger means.

11. A system as in claim 1, wherein that first cycle's condenser means comprises an open cycle air, fluid evaporative cooling means.

12. A system as in claim 1, wherein that first cycle's boiler means is an open cycle air to that first cycle's fluid heat exchanger means.

* * * * *